(12) United States Patent
Costamagna et al.

(10) Patent No.: US 10,107,103 B2
(45) Date of Patent: Oct. 23, 2018

(54) ROTOR FOR A THERMAL TURBOMACHINE

(71) Applicant: Siemens Aktiengesellschaft, Munich (DE)

(72) Inventors: Karin Costamagna, Mulheim a.d. Ruhr (DE); Karsten Kolk, Mulheim a.d. Ruhr (DE); Sebastian Stock, Mulheim a.d. Ruhr (DE); Vyacheslav Veitsman, Gelsenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 263 days.

(21) Appl. No.: 14/904,542

(22) PCT Filed: Jun. 26, 2014

(86) PCT No.: PCT/EP2014/063561
§ 371 (c)(1),
(2) Date: Jan. 12, 2016

(87) PCT Pub. No.: WO2015/007494
PCT Pub. Date: Jan. 22, 2015

(65) Prior Publication Data
US 2016/0146010 A1 May 26, 2016

(30) Foreign Application Priority Data

Jul. 17, 2013 (EP) .................................... 13176855

(51) Int. Cl.
*F01D 5/08* (2006.01)
*F01D 5/06* (2006.01)
(Continued)

(52) U.S. Cl.
CPC ............... *F01D 5/087* (2013.01); *F01D 5/02* (2013.01); *F01D 5/06* (2013.01); *F01D 25/12* (2013.01);
(Continued)

(58) Field of Classification Search
CPC . F01D 5/06; F01D 5/066; F01D 5/085; F01D 5/087; F04D 17/02; F04D 29/321; F05D 2240/24
See application file for complete search history.

(56) References Cited

U.S. PATENT DOCUMENTS 2,656,147 A   10/1953   Denison et al.
4,787,820 A   11/1988   Stenneler et al.
(Continued)

FOREIGN PATENT DOCUMENTS

CN   101631932 A   1/2010
CN   102016232 A   4/2011
(Continued)

OTHER PUBLICATIONS

JP Office Action dated Mar. 17, 2017, for JP patent application No. 2016-526492.
(Continued)

*Primary Examiner* — David E Sosnowski
*Assistant Examiner* — Juan G Flores
(74) *Attorney, Agent, or Firm* — Beusse Wolter Sanks & Maire

(57) ABSTRACT

A rotor for a thermal turbomachine, in particular a gas turbine, is configured for guiding a medium in its interior. In order to guide the medium in the interior with low flow losses, a pair of rotor disks lie on one another, of which the first of the two rotor disks of the pair has holes, in order to feed the medium from the outside into the rotor interior, and rib-shaped ribs, in order to guide the medium further in the direction of the rotational axis, and the second rotor disk of the pair being configured with the aid of an auxiliary web in such a way that the flow passages which are formed between (Continued)

the ribs as viewed in the circumferential direction are delimited axially at least over the large part of the radial extent of the ribs.

7 Claims, 2 Drawing Sheets

(51) Int. Cl.
| | |
|---|---|
| *F04D 29/32* | (2006.01) |
| *F04D 29/58* | (2006.01) |
| *F01D 5/02* | (2006.01) |
| *F01D 25/12* | (2006.01) |

(52) U.S. Cl.
CPC ......... *F04D 29/321* (2013.01); *F04D 29/582* (2013.01); *F04D 29/584* (2013.01); *F05D 2220/32* (2013.01); *F05D 2240/24* (2013.01); *F05D 2240/81* (2013.01); *Y02T 50/673* (2013.01); *Y02T 50/676* (2013.01)

(56) References Cited

U.S. PATENT DOCUMENTS

| | | | | |
|---|---|---|---|---|
| 4,919,590 A | * | 4/1990 | Stratford | ................ F01D 5/087 |
| | | | | 415/116 |
| 5,700,130 A | | 12/1997 | Maurice et al. | |
| 6,808,362 B1 | * | 10/2004 | Glahn | ................... F04D 29/321 |
| | | | | 415/115 |
| 6,857,851 B2 | * | 2/2005 | Avignon | ................. F01D 5/082 |
| | | | | 415/116 |
| 2003/0133788 A1 | | 7/2003 | Avignon et al. | |
| 2010/0166559 A1 | | 7/2010 | Ahaus et al. | |
| 2011/0033303 A1 | | 2/2011 | Pegouet | |
| 2011/0058941 A1 | | 3/2011 | Behaghel et al. | |
| 2012/0027606 A1 | | 2/2012 | Malmborg | |
| 2012/0275926 A1 | | 11/2012 | Pauli et al. | |
| 2013/0283813 A1 | | 10/2013 | Laurello et al. | |

FOREIGN PATENT DOCUMENTS

| | | | | |
|---|---|---|---|---|
| CN | 102016233 A | | 4/2011 | |
| DE | 3310529 A1 | | 10/1996 | |
| DE | 19617539 A1 | * | 11/1997 | ............ F01D 5/063 |
| DE | 19617539 A1 | | 11/1997 | |
| DE | 19852604 A1 | | 5/2000 | |
| DE | 19617539 B4 | | 2/2006 | |
| EP | 1276971 B1 | | 7/2006 | |
| GB | 1119392 A | | 7/1968 | |
| JP | S45003841 B | | 2/1970 | |
| JP | 59003101 A | * | 1/1984 | ............ F01D 5/066 |
| JP | S63176629 A | | 7/1988 | |
| JP | 2013510259 A | | 3/2013 | |

OTHER PUBLICATIONS

JP office action dated Mar. 12, 2018, for JP patent application No. 2016093688.
CN Office Action dated Nov. 30, 2017, for CN patent application No. 201610243940.2.

* cited by examiner

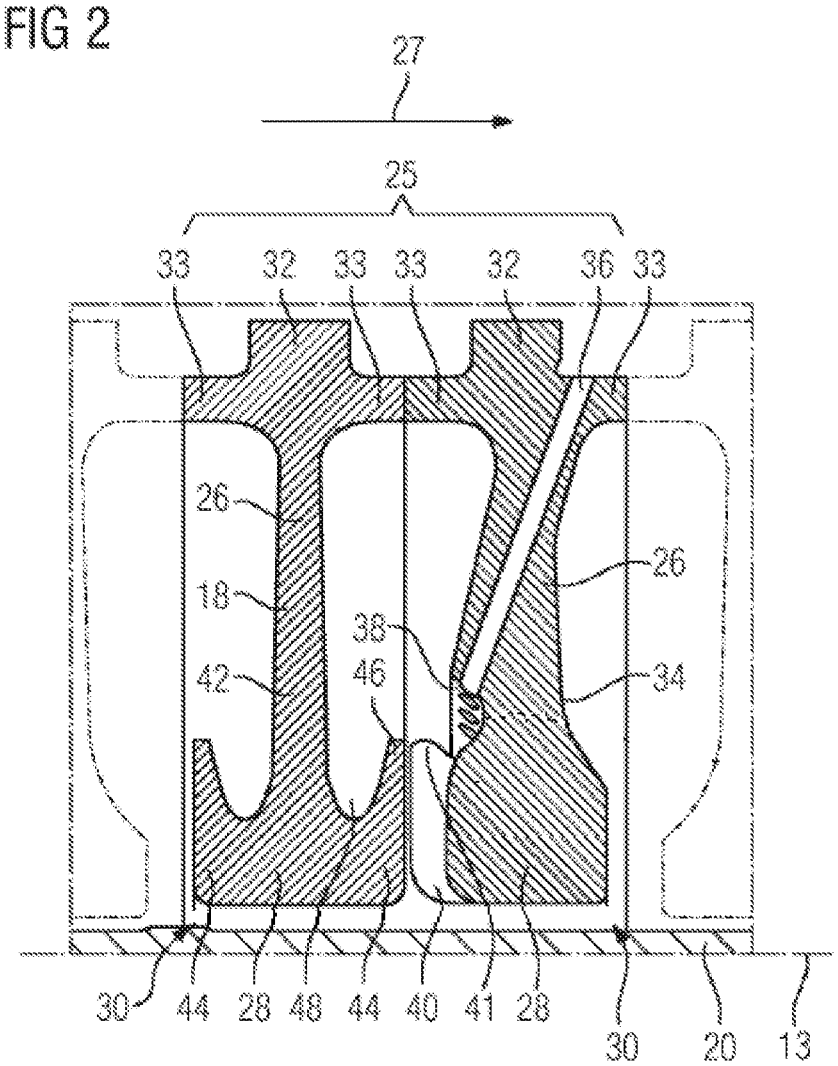

ROTOR FOR A THERMAL TURBOMACHINE

CROSS REFERENCE TO RELATED APPLICATIONS

This application is the US National Stage of International Application No. PCT/EP2014/063561 filed Jun. 26, 2014, and claims the benefit thereof. The International Application claims the benefit of European Application No. EP13176855 filed Jul. 17, 2013. All of the applications are incorporated by reference herein in their entirety.

FIELD OF INVENTION

The invention relates to a rotor for a thermal turbomachine, which rotor is configured in the interior for conducting a medium.

BACKGROUND OF INVENTION

Rotors for thermal turbomachines such as axial compressors and gas turbines are known in different designs from the comprehensively available prior art. For example, welded rotors are known for gas turbines, in the case of which welded rotors drums of different width are welded to one another to form a monolithic rotor. Secondly, it is known to stack a plurality of disk-shaped elements (also known as rotor disks) and to brace them with the aid of one or more tie rods to form a fixed structure. Even combinations of said designs are known. Rotor blades are mounted on the outside of all rotors, which rotor blades can be assigned in the case of gas turbines, for example, either to the compressor or to the turbine unit. Regardless of the design, a medium can be introduced into the interior of the rotors via holes which are arranged in the rotor shell, in order to conduct said medium from the feed position to a second axial position, where the medium is removed from the rotor again. This method is used, in particular, in gas turbines, in order to remove cooling air from the main flow path of the compressor of a gas turbine on the rotor side and to conduct it to the turbine unit, where, guided out of the rotor interior again, it can be used for cooling air purposes and/or sealing air purposes.

In order to make an aerodynamically efficient removal of air from the compressor of a gas turbine and efficient conducting of the air in the rotor interior possible, different constructions are known.

For example, DE 196 17 539 A1 has disclosed conducting the air which flows with a swirl into the rotor cavity on account of the rotation of the rotor via radially extending ribs to the rotor center. The conducting causes the circumferential speed of the air which exits from the holes to be reduced as the radius becomes smaller, which prevents an impermissibly great swirl formation. For this reason, the ribs are called "deswirlers" in English.

SUMMARY OF INVENTION

It is an object of the present invention to provide an alternative solution, in which the pressure and flow losses in the rotor interior are reduced further.

The object of the invention is achieved by way of a rotor and by way of a rotor disk in accordance with the claims. The rotor according to the invention comprises at least one rotor disk in accordance with the independent claim.

Advantageous refinements are specified in the dependent claims, the features of which can be combined with one another in accordance with the back-references.

The inventors have recognized that flow losses can occur in the region of the radial ribs in the prior art, since said ribs tend to lie comparatively wide apart from one another in the circumferential direction and there are therefore great flow cross sections at this point for the medium which is removed from the turbomachine. This is all the more true, since the flow passages between the known ribs also have a comparatively great axial extent. In order to eliminate said disadvantage, it is firstly proposed according to the invention to also axially delimit the flow cross section of the flow passages between the ribs. The axial delimitation is advantageously to be configured at least over a large part of the radial extent of the ribs.

For this reason, that rotor disk which lies directly opposite the ribs has an outwardly pointing, freely ending annular auxiliary web at its hub region which is widened with respect to the width of the disk web, which auxiliary web axially delimits the flow passages formed between the ribs for the medium which flows through the holes over the entire radial extent of the ribs. This reduces aerodynamic flow losses during the feeding of the medium which flows into the rotor interior in the region of the ribs and leads to an aerodynamically improved guidance of the removed medium along the ribs, from the outside to the inside.

It is to be noted that the terms "axial" and "radial" and "outside" and "inside" always relate to the rotational axis of the rotor disk or the rotor. In addition, the rotor interior is to be understood as that cavity in the interior of the rotor which is delimited by the rotor disks. In other words, the holes of the first rotor disk are not part of the rotor interior.

In the case of rotors which are assembled from disks, regardless of whether the disks are later welded to one another or are braced with one another via one or more tie rods, one of the two rotor disks (called the first rotor disk in the following text) comprises the holes, in order to transfer the medium from the outside into the rotor interior, and a multiplicity of ribs for forwarding the flow of the medium which can flow through the holes. On the inner side of the rotor, the holes open in a ring face of the rotor, which ring face is arranged obliquely with respect to the radial direction. The ribs end immediately adjacently with respect thereto radially on the inside.

The other of the two rotor disks for the rotor according to the invention (called the second rotor disk in the following text) comprises an endlessly circulating disk web which, at its radially inner end in relation to the rotational axis, has a hub region with a central opening which is concentric with respect to the rotational axis and, at its radially outer end, has an axially widened ring region for bearing against the adjacent disks and for receiving rotor blades, the hub region being widened on both sides in the axial direction in comparison with a thickness of the disk web, with the result that an outwardly pointing freely ending annular auxiliary web is provided on at least one of the projecting lengths which are formed in this way, with the formation of an annular recess between the disk web and the auxiliary web.

In an example embodiment, the extent of the ribs, which can be detected in the radial direction, and that of the auxiliary web including the projecting length are adapted to one another in such a way that they are approximately identically great, that is to say the ribs and the auxiliary web or the projecting length advantageously end at the same radius on the outside and on the inside. In another example embodiment, the extent of the ribs need not be exactly the same as the extent of the auxiliary web.

In the case of the first rotor disk, the ribs can extend along the radial direction from the inside toward the outside. This leads to particularly effective deswirling of the medium which flows in from the outside, which reduces the flow losses.

Further, at least one of the ribs, advantageously all the ribs, has/have a freely ending extension at their radially outwardly pointing ends, as a result of which the spacing between the hole opening on the rotor inner side and the radially outer end of the respective rib can be reduced further. The reduction of said spacings leads to improved guidance of the medium which exits from the holes, which further reduces the flow losses.

In the ring region on both disk sides, both rotor disks advantageously comprise a transversely projecting collar with a collar height which can be detected in the axial direction of the rotational axis, the collar height of which is slightly greater than the height, which can be detected in an analogous manner, of the relevant projecting length or the ribs. With the aid of the slightly greater collars, the rotor disks have a greater axial width on their radially outer regions than radially on the inside, which prevents the auxiliary web coming into contact with the ribs when both rotor disks bear against one another. Said contact might lead to mechanical wear which can be avoided thus, however. The heights and the axial widths of the rotor disks in the ring region are advantageously selected in such a way that the axial spacings between the ribs and the lateral surface of the auxiliary web which lies opposite are kept as small as possible, with consideration of the thermal expansions which occur during operation.

Further, the holes which extend through the disk web are inclined in such a way that, in the ring region, the holes open on a downstream side of the first rotor disk, in relation to the throughflow direction of the medium in the main flow path of the turbomachine. Therefore, the removal position for the medium to be extracted lies downstream of the rotor blades which are supported by the relevant rotor disk. In other words: the holes are inclined in a downstream manner, in relation to their inner end.

The inclined holes assist the uniform heating of the rotor disk, which reduces thermal stresses in the rotor disk. At the same time, the removal of a medium takes place from the main stream of the turbomachine at an axial position, in which the circumferential speed of the medium in the main flow path of the turbomachine corresponds substantially to the circumferential speed of the rotor. This facilitates the inflow of the medium into the holes, which reduces aerodynamic losses. Positive inflow conditions for the medium to be removed from the main flow are therefore provided.

Both rotor disks can advantageously be configured as a compressor disk or as a turbine disk. In the case of compressor disks, the holes advantageously open on the outside in the collar and, in the case of turbine disks, the holes open on the outside in the fastening grooves of the rotor blades.

The invention relates overall to a rotor for a thermal turbomachine, in particular a gas turbine, which rotor is configured to conduct a medium, for example compressor air, in its interior. In order to conduct said medium in the interior with low flow losses, it is provided that a pair of rotor disks is provided which bear against one another and of which the first of the two rotor disks of the pair has holes, in order to feed the medium from the outside into the rotor interior, and rib-shaped ribs, in order to guide the medium further in the direction of the rotational axis, and the second rotor disk of the pair being configured with the aid of an auxiliary web in such a way that the flow passages which are formed between the ribs as viewed in the circumferential direction are delimited axially at least over the large part of the radial extent of the ribs.

Further advantages and features of the invention will be explained using a single exemplary embodiment.

BRIEF DESCRIPTION OF THE DRAWINGS

In the drawing:
FIG. 1 shows a longitudinal section through a rotor of a turbomachine and
FIG. 2 shows a detail through the longitudinal section of a rotor according to the invention of a turbomachine with essentially two rotor disks.

DETAILED DESCRIPTION OF INVENTION

Figure 1:
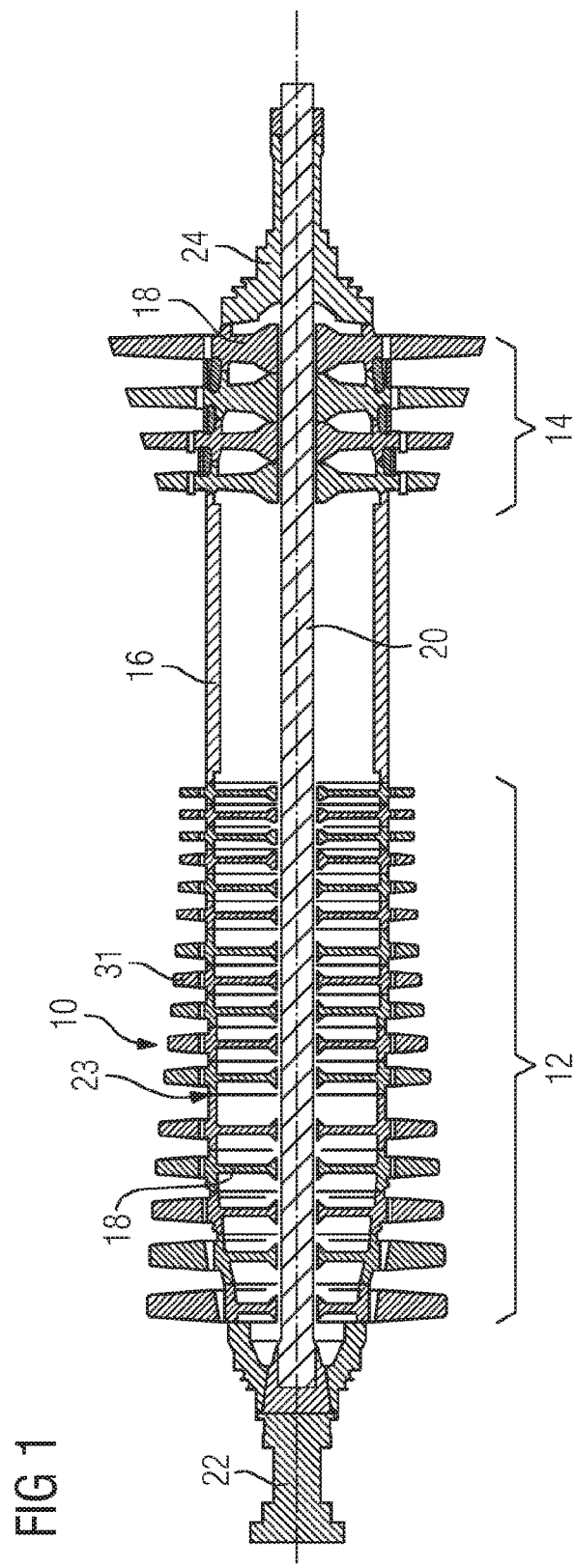

Identical features are provided with the same designations in both figures.

FIG. 1 shows the principal diagrammatic construction of a rotor 10 of a thermal turbomachine which, in the assembled state, is mounted such that it can be rotated about its rotational axis 13. In the exemplary embodiment which is shown, this is the rotor 10 of a stationary gas turbine. The rotor 10 might also be used in an aircraft gas turbine. On account of the use in a gas turbine, the rotor 10 comprises a compressor section 12 and a turbine section 14.

A tube 16 is provided between the two sections 12, 14. Both the compressor section 12 and the turbine section 14 are of disk-type design. In the exemplary embodiment which is shown, the compressor section 12 comprises sixteen rotor disks 18 and the turbine section 14 comprises four rotor disks 18. A tie rod 20 extends through all rotor disks 18 and the tube 16, onto the two ends of which tie rod 20 what is known as a front hollow shaft 22 and what is known as a rear hollow shaft 24 are screwed. The two hollow shafts 22, 24 brace all the rotor disks 18 and the tube 16 with one another, with the result that relative movements in the circumferential direction are avoided as far as possible. In detail, this is by way of Hirth toothing systems which are arranged on the contact faces 23. They are not shown in further detail, however.

The features according to the invention are not shown in FIG. 1. Reference is made in this regard to FIG. 2 which shows a detail of two arbitrary rotor disks 18 of the compressor section 12 from FIG. 1 which form a disk pair 25, however, on an enlarged scale.

In the operating state, air flows as a medium outside the rotor 10 in a main flow path (not shown in further detail) in the arrow direction 27, which air is compressed during this by the compressor.

Each rotor disk 18 has a disk web 26 which runs endlessly about the rotational axis 13. At its radially inner end, the disk web 26 has a hub region 28 with a central opening 30 which is concentric with respect to the rotational axis and, at its radially outer end, a rim region 32. The rim region serves to fasten rotor blades 31 (FIG. 1) and comprises collars 33 which are arranged on both sides and on which the adjacent rotor disks 18 bear against one another. The rotor disk 18 which is shown on the right-hand side in the middle in FIG. 2 is called the first rotor disk 34 in the following text. In addition, the first rotor disk 34 has holes which extend inward through the disk web 26 from the rim region and are distributed uniformly along the circumference of the disk web 26. Merely one of the holes is shown and is labeled with the designation 36. The holes 36 are inclined with respect to the radial direction in such a way that they penetrate the disk web 26 from one side to the other side. The holes 36 open with their radially inner end in a ring face 38 which ring face 38 is arranged obliquely with respect to the radial direction of the rotor disk 34. A multiplicity of ribs 40 are provided in the hub region 28 immediately adjacently with respect to the ring face 38. The ribs 40 extend from an outer to an inner end. In addition, the ribs 40 are distributed uniformly along the circumference. The ribs 40 can be welded to the hub region 28 of the first rotor disk 34 or can have been manufactured at the same time as the latter. In relation to the fastened section of the rib 40, each has an extension at the outer end of the rib 40, in order to keep the spacing at 41 of the ring face 38 and the openings of the holes 36 as small as possible. In terms of structural mechanics, the key is to avoid the ribs 40 also being fastened in a circumferential hollow channel, but it is likewise necessary in terms of structural mechanics between the ring face 38 and the hub region 28.

The ribs 40 serve for flow guidance of the air which flows from the holes 36 and is to flow into the interior of the rotor 10. That side of the first rotor disk 34, on which the ribs 40 are provided, is adjoined by a second rotor disk 42 Like every customary rotor disk 18, the second rotor disk 42 also has a hub region 28, the axial extent of which is wider on account of two projecting lengths 44 than that of the associated disk web 26. For reasons of symmetry, an outwardly pointing freely ending annular auxiliary web 46 is provided on both projecting lengths 44, with the formation of an annular recess 48 between the disk web 26 and the auxiliary web 46, although only that auxiliary web 46 would be necessary which lies directly opposite the ribs 40. The auxiliary web 46 in conjunction with the projecting length 44 delimits, over the entire radial extent of the ribs 40, the flow passages, in which the cooling air which exits from the holes 36 enters and is conducted as far as the tie rod 20. This avoids swirling of the air at the inlet of each flow passage, which improves the efficiency of the air conducting.

Since the central openings 30 of the rotor disks 18 are larger than the diameter of the tie rod 20, annular spaces are formed between the respective hub regions 28 and the tie rod 20, through which annular spaces the air which is conducted to the tie rod 20 can be conducted in the axial direction along the tie rod 20 from the compressor section 12 to the turbine section 14.

It goes without saying that the above-described disk pair 25 can also be used to conduct the air which is conducted along the tie rod 20 toward the outside, as is necessary in the case of rotor disks 18 in the turbine section 14.

The invention claimed is:

1. A rotor for a turbomachine, comprising:
   at least one pair of rotor disks which lie on one another, wherein a first rotor disk of the at least one pair of rotor disks comprises a first disk web which runs endlessly about a rotational axis of the rotor and which comprises a first hub region at a radially inner end of the first disk web and comprising a first central opening therethrough and a first ring region configured to receive rotor blades at a radially outer end of the first disk web, from which first ring region holes are arranged which are distributed along a circumference of the first rotor disk, which penetrate the first disk web toward the inside, and which open into a ring face of the first rotor disk which is arranged obliquely with respect to a radial direction of the first rotor disk, the first hub region comprising a multiplicity of radially oriented ribs configured to partly define flow paths therebetween, the flow paths providing fluid communication between the holes and the first central opening, wherein a second rotor disk of the at least one pair of rotor disks comprises a second disk web which runs endlessly about the rotational axis and which comprises a second hub region at a radially inner end of the second disk web comprising a second central opening therethrough and a second ring region configured to receive the rotor blades at a radially outer end of the second disk web, the second hub region comprising a projecting length on both sides of the second disk web in an axial direction of the rotor, one of the projecting lengths comprising an outwardly pointing freely ending annular auxiliary web, wherein an arrangement of the first rotor disk and the second rotor disk being selected such that the ribs and the auxiliary web are radially aligned so that the auxiliary web also partly defines the flow paths between the ribs, and wherein at least one of the ribs comprises a freely ending extension at its radially outwardly pointing ends.

2. The rotor as claimed in claim 1,
   wherein an extent, which can be detected in the radial direction, of the ribs and that of the auxiliary web and the projecting length are adapted to one another such that the ribs and the auxiliary web or the projecting length end on the same radius on the outside and on the inside.

3. The rotor as claimed in claim 1,
   wherein each rib extends along the radial direction from the inside to the outside.

4. The rotor as claimed in claim 1,
   wherein all of the ribs comprise the freely ending extension at respective radially outwardly pointing ends.

5. A rotor for a turbomachine, comprising:
   a first rotor disk comprising: a first disk web comprising a first hub and a first ring region configured to receive rotor blades; and holes each comprising a first opening arranged in the first ring region and a second opening at a ring face of the first rotor disk which is arranged radially inward of the first opening and obliquely with respect to a radial direction of the first rotor disk;
   wherein the first hub comprises a first central opening therethrough and a multiplicity of radially oriented ribs configured to partly define radially oriented flow paths therebetween, the flow paths providing fluid communication between the holes and the first central opening; and
   a second rotor disk disposed upstream of the first rotor disk and comprising a second disk web comprising a second hub region and a second ring region configured to receive the rotor blades;
   wherein the second hub region comprises a projecting length on both sides of the second disk web in an axial direction of the rotor, one of the projecting lengths comprising an outwardly pointing freely ending annular auxiliary web;
   wherein the rotor is configured such that the ribs and the auxiliary web are radially aligned so that the auxiliary web also partly defines the flow paths between the ribs, and
   wherein at least one of the ribs comprises a freely ending extension at its radially outwardly pointing ends.

6. The rotor of claim 5, wherein radially outward ends of the ribs define an annular shape, the second openings aim toward the annular shape.

7. The rotor of claim 5, wherein the ribs and the auxiliary web are set apart axially, thereby forming a gap therebetween.

\* \* \* \* \*